United States Patent
Kim et al.

(10) Patent No.: US 11,186,281 B2
(45) Date of Patent: Nov. 30, 2021

(54) APPARATUS AND METHOD FOR PREVENTING VEHICLE FROM FALLING

(71) Applicants: Hyundai Motor Company, Seoul (KR); Kia Motors Corporation, Seoul (KR)

(72) Inventors: Byeong Hwa Kim, Incheon (KR); Chang Hwan Song, Daejeon (KR); Dong Hun Yang, Gyeonggi-do (KR); Jun Ho Yang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 189 days.

(21) Appl. No.: 16/507,377

(22) Filed: Jul. 10, 2019

(65) Prior Publication Data
US 2020/0290616 A1    Sep. 17, 2020

(30) Foreign Application Priority Data

Mar. 12, 2019 (KR) .......................... 10-2019-0028224

(51) Int. Cl.
  *B60W 30/18* (2012.01)
  *B60T 7/22* (2006.01)
(52) U.S. Cl.
  CPC ......... *B60W 30/18009* (2013.01); *B60T 7/22* (2013.01); *B60W 2520/06* (2013.01);
  (Continued)
(58) Field of Classification Search
  CPC .... B60T 7/22; B60T 2210/02; B60T 2210/14; B60Y 2300/24; B60Y 2300/26;
  (Continued)

(56) References Cited

U.S. PATENT DOCUMENTS

2012/0191315 A1* 7/2012 Fehse ..................... G08G 1/165
                                                                 701/70
2015/0224845 A1* 8/2015 Anderson ............ B60G 17/019
                                                                 701/37
(Continued)

FOREIGN PATENT DOCUMENTS

CN          107031332 A * 8/2017 ........... G06K 9/2018
KR     10-2014-0044567 A    4/2014
(Continued)

OTHER PUBLICATIONS

Fox, et al.; Multi-Lane Pothole Detection from Crowdsourced Undersampled Vehicle Sensor Data. IEEE Transactions on Mobile Computing: vol. 16, Issue: 12, Dec. 1, 2017; pp. 3417-3430 (Year: 2017).*

*Primary Examiner* — Atul Trivedi
(74) *Attorney, Agent, or Firm* — Mintz Levin Cohn Ferris Glovsky and Popeo, P.C.; Peter F. Corless (57) ABSTRACT

An apparatus and a method for preventing a vehicle from falling into a sinkhole are provided. The apparatus prevents the vehicle from being unnecessarily stopped by determining whether to stop the vehicle based on a size of the sinkhole while preventing the vehicle from falling into the sinkhole on a road. The apparatus includes a sensor that is mounted on the vehicle to measure a distance to a ground and a controller that determines a size of the sinkhole based on the distance to the ground and determines whether to stop the vehicle while preventing the vehicle from falling into the sinkhole on a road.

18 Claims, 9 Drawing Sheets

(52) U.S. Cl.
CPC ..... *B60W 2520/10* (2013.01); *B60W 2540/18* (2013.01); *B60W 2552/35* (2020.02); *B60W 2710/18* (2013.01); *B60Y 2300/24* (2013.01); *B60Y 2300/26* (2013.01)

(58) Field of Classification Search
CPC ....... B60W 2710/18; B60W 30/18009; B60W 2520/06; B60W 2520/10; B60W 2540/18; B60W 2552/35
USPC .......................................................... 701/70
See application file for complete search history.

(56) References Cited

U.S. PATENT DOCUMENTS

| | | | |
|---|---|---|---|
| 2016/0339959 A1* | 11/2016 | Lee ................... | G06K 9/00798 |
| 2018/0162387 A1* | 6/2018 | Sung ..................... | B60W 30/09 |
| 2018/0181121 A1* | 6/2018 | Min ...................... | B60W 30/08 |
| 2018/0215373 A1* | 8/2018 | Varnhagen ............ | B60W 40/10 |
| 2018/0326999 A1* | 11/2018 | Hershkovitz ......... | B60W 50/14 |
| 2019/0135283 A1* | 5/2019 | Bonk .................... | G05D 1/0231 |
| 2019/0210593 A1* | 7/2019 | Barrera ...................... | A47L 5/38 |
| 2019/0384294 A1* | 12/2019 | Shashua ............... | G05D 1/0088 |
| 2020/0073405 A1* | 3/2020 | Xu .................... | G08G 1/096811 |
| 2020/0125088 A1* | 4/2020 | Raichelgauz ...... | G06K 9/00805 |
| 2020/0209864 A1* | 7/2020 | Chen .................. | G01C 21/3811 |
| 2020/0238999 A1* | 7/2020 | Batts ........................ | G08G 1/165 |
| 2020/0250984 A1* | 8/2020 | Du ........................... | G01C 7/02 |
| 2020/0391762 A1* | 12/2020 | Raichelgauz ......... | B60W 40/09 |
| 2020/0398833 A1* | 12/2020 | Hudecek .............. | G05D 1/0214 |

FOREIGN PATENT DOCUMENTS

| | | | | |
|---|---|---|---|---|
| KR | 10-2014-0044576 A | 4/2014 | | |
| WO | WO-2014108556 A1 * | 7/2014 | ............ | B60W 40/06 |

* cited by examiner

APPARATUS AND METHOD FOR PREVENTING VEHICLE FROM FALLING

CROSS-REFERENCE TO RELATED APPLICATION

This application claims the benefit of priority to Korean Patent Application No. 10-2019-0028224, filed on Mar. 12, 2019, the entire contents of which are incorporated herein by reference.

TECHNICAL FIELD

The present disclosure relates to a technique for preventing a vehicle in operation from falling into a sinkhole on a road, and more particularly, to a technology that prevents a vehicle from being stopped when a sinkhole is detected.

BACKGROUND

In recent years, sinkholes are being formed in the road due to a variety of reasons. Sinkholes vary in size from a sinkhole that does not cause any concern even though a vehicle passes over it to a larger sized sinkhole in which a vehicle may sink. The smaller sinkhole has no influence on a traveling vehicle, however, the larger size sinkhole damages vehicles. Thus, sinkholes are becoming a social concern.

Accordingly, systems for preventing the vehicle from falling into such sinkholes have been developed. However, a conventional system does not provide a method of determining a possible danger of the vehicle falling into a sinkhole. Particularly, in determining the possible danger of vehicle falling, the conventional system does not determine whether the sinkhole exerts influence on the operation of the vehicle. Accordingly, the vehicle has to stop unnecessarily even though the sinkhole has a small size with no influence to the driving of the vehicle.

SUMMARY

The present disclosure provides an apparatus and a method for preventing a vehicle from falling into a sinkhole, which prevent the vehicle from being unnecessarily stopped by determining whether to stop the vehicle based on a size of a sinkhole in a process of preventing the vehicle from falling into the sinkhole on a road. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus of preventing a vehicle from falling may include a sensor mounted on the vehicle to measure a distance to a ground and a controller configured to determine a size of a sinkhole based on the distance to the ground, and determine whether to stop the vehicle based on the determined result. The controller may be configured to distinguish the ground from the sinkhole based on the distance to the ground measured by the sensor. In particular, the controller may be configured to detect a depth and an area of the sinkhole based on the distance to the ground and determine whether to stop the vehicle based on the depth and the area of the sinkhole. The apparatus may further include a storage configured to store reference depth data and reference area data.

Meanwhile, the controller may be configured to determine whether the sinkhole is present on a traveling path of the vehicle based on a vehicle speed and a steering angle of the vehicle and estimate a time at which the vehicle is predicted to fall into the sinkhole present on the traveling path of the vehicle based on the vehicle speed and the steering angle of the vehicle. Additionally, a plurality of sensors may be provided, and at least two sensors may be mounted at a rear bumper of the vehicle. The sensor may be mounted on the vehicle to have a reference vertical angle and a reference horizontal angle, and the vertical angle is an angle that is two times or more greater than an angle between the ground and a virtual straight line that connects a center of the vehicle and a rear wheel and faces the ground.

According to an aspect of the present disclosure, a method of preventing a vehicle from falling may include measuring, by a sensor mounted on the vehicle, a distance to a ground and determining, by a controller, a size of a sinkhole based on the measured distance to the ground to determine whether to stop the vehicle based on the determined result. The determining of whether to stop the vehicle may include distinguishing the ground from the sinkhole based on the distance to the ground and detecting a depth and an area of the sinkhole based on the distance to the ground. The determining of whether to stop the vehicle may also include determining whether to stop the vehicle based on the depth and the area of the sinkhole. The method may further include storing, by a storage, reference depth data and reference area data.

Additionally, the determining of whether to stop the vehicle may include determining whether the sinkhole is present on a traveling path of the vehicle based on a vehicle speed and a steering angle of the vehicle and estimating a time at which the vehicle is predicted to fall into the sinkhole present on the traveling path of the vehicle. A plurality of sensors may be provided, and at least two sensors may be mounted at a rear bumper of the vehicle. In particular, the sensor may be mounted on the vehicle to have a reference vertical angle and a reference horizontal angle, and the vertical angle is an angle that is two times or more greater than an angle between the ground and a virtual straight line that connects a center of the vehicle and a rear wheel and faces the ground.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
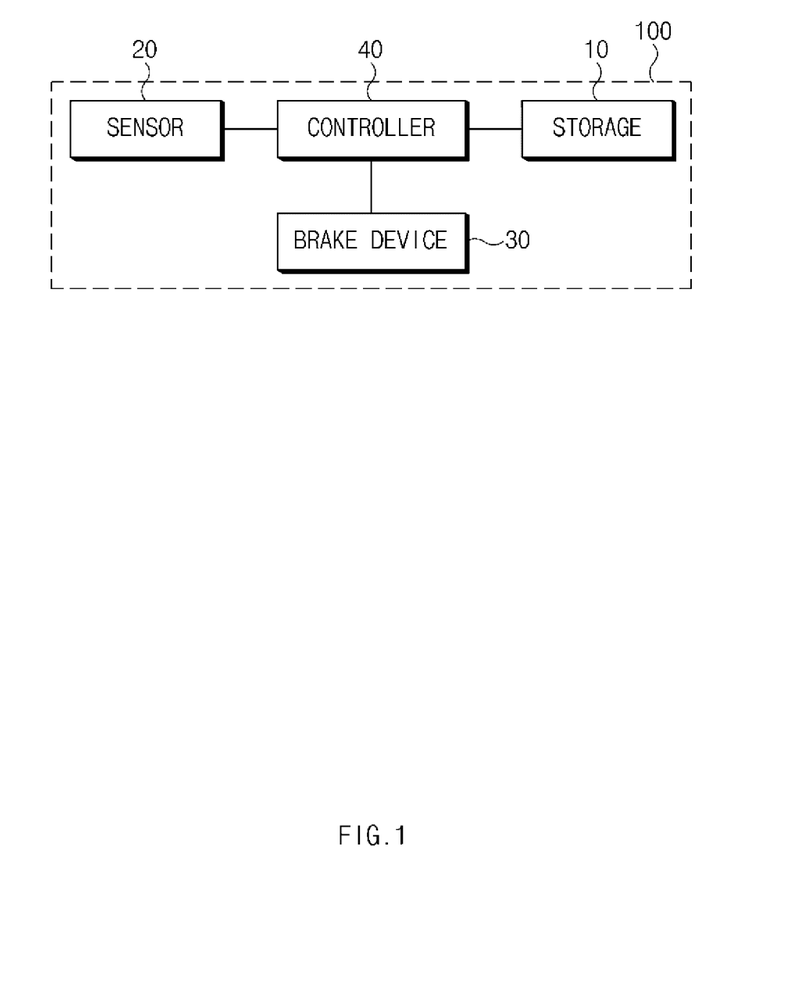
FIG. 1 is a view illustrating a configuration of a vehicle fall prevention apparatus according to an exemplary embodiment of the present disclosure.

In the exemplary embodiment of the present disclosure, a sinkhole will be described as a representative example, however, the present disclosure may be applied to a cliff, a puddle, a ditch, or a bank of a field. FIG. 1 is a view illustrating a configuration of a vehicle fall prevention apparatus according to an exemplary embodiment of the present disclosure.

As shown in FIG. 1, the vehicle fall prevention apparatus 100 may include a storage 10 (e.g., a memory), a sensor 20, a brake device 30, and a controller 40. According to the vehicle fall prevention apparatus 100 of the present disclosure, components may be combined with each other into one device, and one or more components may be omitted depending on the manner in which the present disclosure is carried out. Hereinafter, each of the above components will be described in detail. First, the storage 10 may be configured to store various logics, algorithms, and programs required to determine whether to stop the vehicle by detecting a size of the sinkhole in a process of preventing the vehicle from falling into the sinkhole on a road on which the vehicle is being driven.

In addition, the storage 10 may be configured to store reference data used to determine whether to stop the vehicle. For example, the storage 10 may be configured to store reference data for a depth of the sinkhole (hereinafter, referred to as a "reference depth"), reference data for a horizontal length of the sinkhole (hereinafter, referred to as a "reference horizontal length"), reference data for a vertical length of the sinkhole (hereinafter, referred to as a "reference vertical length"), and reference data for an area of the sinkhole (hereinafter, referred to as a "reference area") as data indicating the size of the sinkhole. Wherein the size of the sink hole corresponds to a tire size of the vehicle.

Further, the storage 10 may include at least one type of storage medium among a memory of a flash type, a hard disk type, a micro type, and a card type (e.g., a Secure Digital (SD) card or an eXtream Digital (XD) card) and a memory of a random access memory (RAM), a static RAM (SRAM), a read-only memory (ROM), a programmable ROM (PROM), an electrically erasable PROM (EEPROM), a magnetic RAM (MRAM), a magnetic disk, and an optical disk type.

Then, the sensor 20 may be implemented as an ultrasonic sensor and a radar as a sensor configured to measure a distance, at least one sensor 20 may be mounted on the front of the vehicle (e.g., a front bumper), and at least one sensor 20 may be mounted on the rear of the vehicle (e.g., a rear bumper).

Figure 2A:
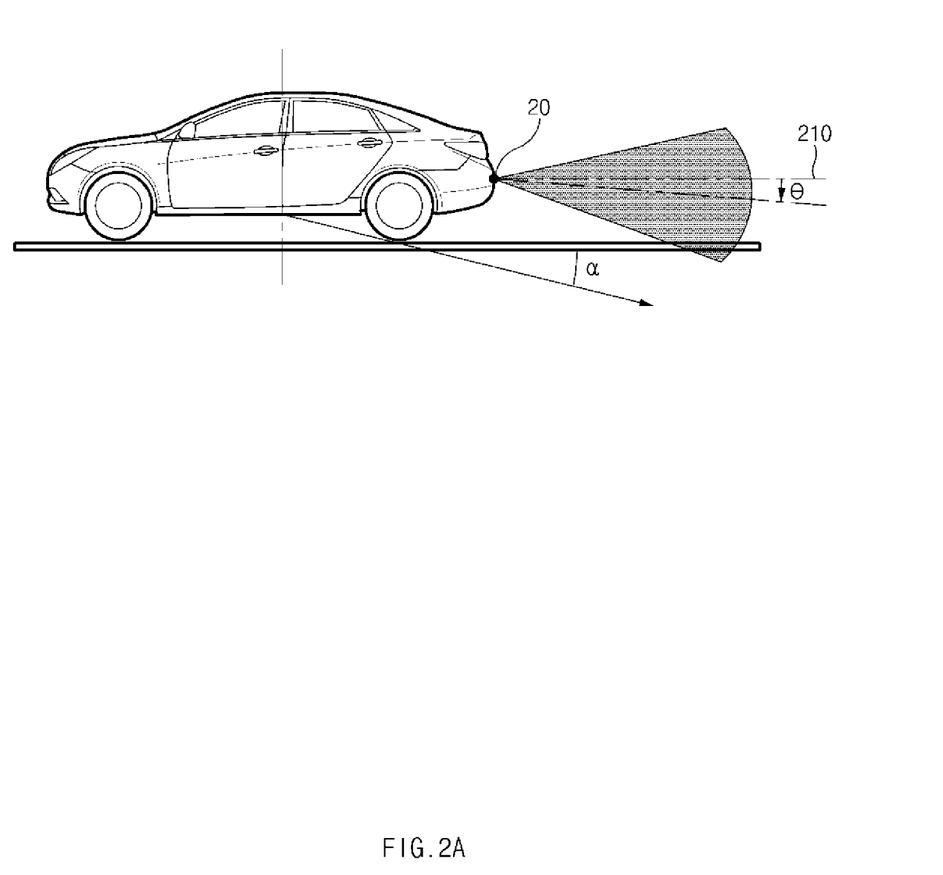
FIG. 2A is a view illustrating a vertical mounting angle of a sensor according to an exemplary embodiment of the present disclosure.

Hereinafter, a mounting method of the sensor 20 will be described in detail with reference to FIGS. 2A and 2B. FIG. 2A is a view illustrating a vertical mounting angle of the sensor 20 mounted on the rear of the vehicle according to an exemplary embodiment of the present disclosure. As shown in FIG. 2A, the sensor 20 may be mounted on the vehicle to face a ground at a predetermined mounting angle θ with respect to a horizontal line 210. As an example, the mounting angle θ of the sensor 20 may be based on the following Formula 1.

$$\theta > 2\alpha \qquad \text{Formula 1}$$

wherein, "α" denotes an angle between a straight line, which connects a center of the vehicle to a rear tire of the vehicle, and the ground (horizontal line). As an example, "α" may have a value between about 8° to 10°, and thus the mounting angle may be at least about 16° or greater.

Figure 2B:
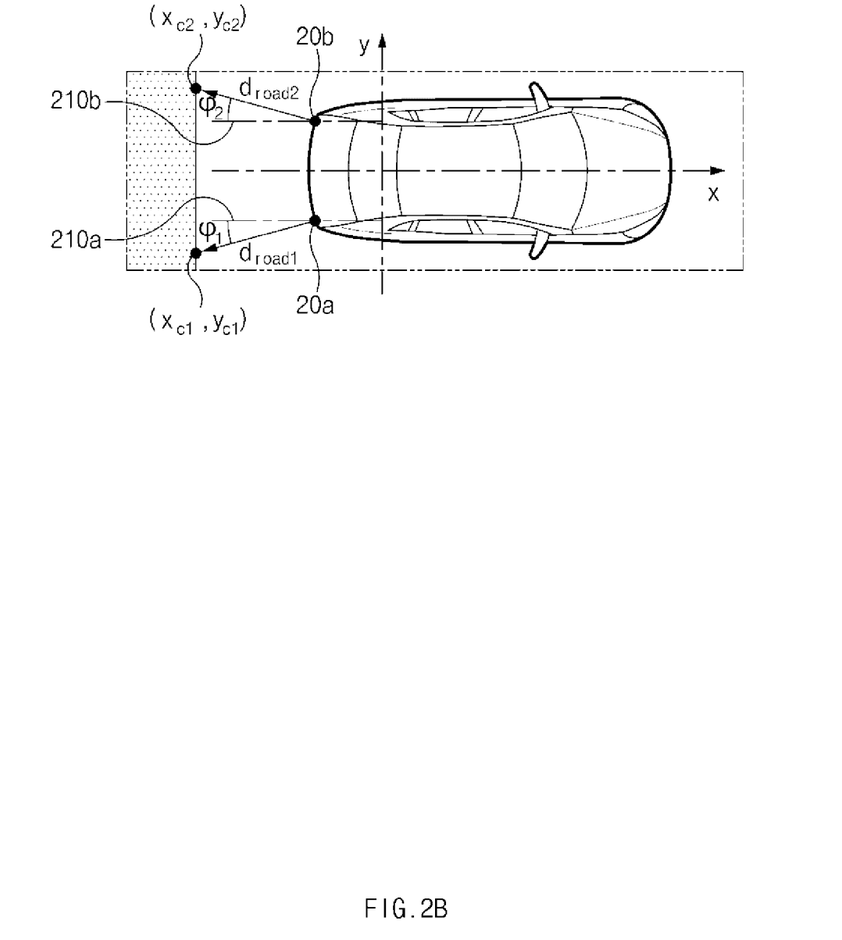
FIG. 2B is a view illustrating a horizontal mounting angle of a sensor according to an exemplary embodiment of the present disclosure.

FIG. 2B is a view illustrating a horizontal mounting angle of the sensor 20 mounted on the rear of the vehicle according to an exemplary embodiment of the present disclosure. As shown in FIG. 2B, the sensor 20 may include a first sensor 20a mounted on a first side of the rear of the vehicle and a second sensor 20b mounted on a second side of the rear of the vehicle to measure the horizontal length of the sinkhole. In particular, the first sensor 20a may be mounted to form a predetermined angle $\Phi_1$ with respect to a straight line 210a substantially parallel to an x-axis on an x-y plane, and the second sensor 20b may be mounted to form a predetermined angle $\Phi_2$ with respect to a straight line 210b substantially parallel to the x-axis on the x-y plane. In the present exemplary embodiment, $\Phi_1$ and $\Phi_2$ are equal but opposite in direction.

In FIG. 2B, $(x_{c1}, y_{c1})$ denotes starting point coordinates of the sinkhole measured by the first sensor 20a, '$d_{road1}$' denotes a distance from the first sensor 20a to a starting point of the sinkhole, $(x_{c2}, y_{c2})$ denotes starting point coordinates of the sinkhole measured by the second sensor 20b, and '$d_{road2}$' denotes a distance from the second sensor 20b to the starting point of the sinkhole.

Then, the brake device 30 may be configured to apply a braking force to the wheels of the vehicle under the control of the controller 40 to stop the vehicle. The controller 40 may be configured to execute an overall operation of each component. The controller 40 may be implemented in hardware, software, or a combination of the hardware and the software. For example, the controller 40 may be implemented by a microprocessor, but it should not be limited to the microprocessor.

The controller 40 may be configured to execute various control operations required to determine whether to stop the vehicle by detecting the size of the sinkhole in the process of preventing the vehicle from falling into the sinkhole on the road. The controller 40 may be configured to distinguish the ground from the sinkhole based on the distance measured by the sensor 20 and detect the size of the sinkhole.

Figure 3A:
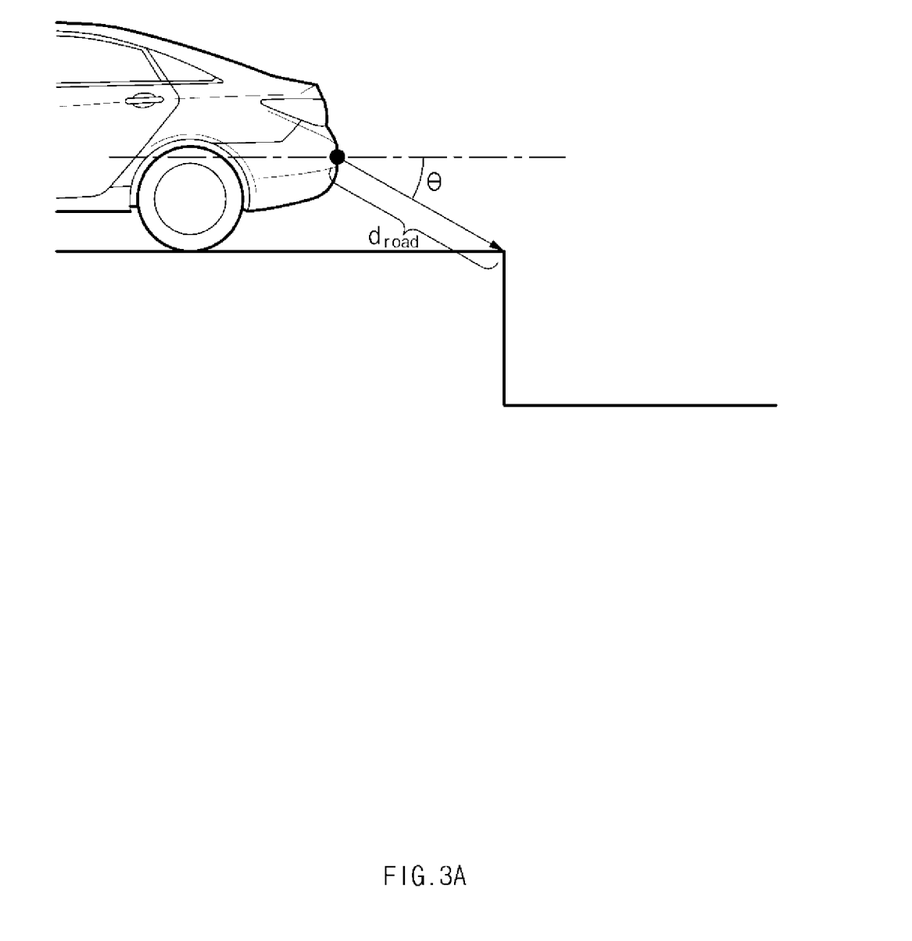
FIG. 3A is a view illustrating a process in which a controller recognizes a ground according to an exemplary embodiment of the present disclosure.
Figure 3B:
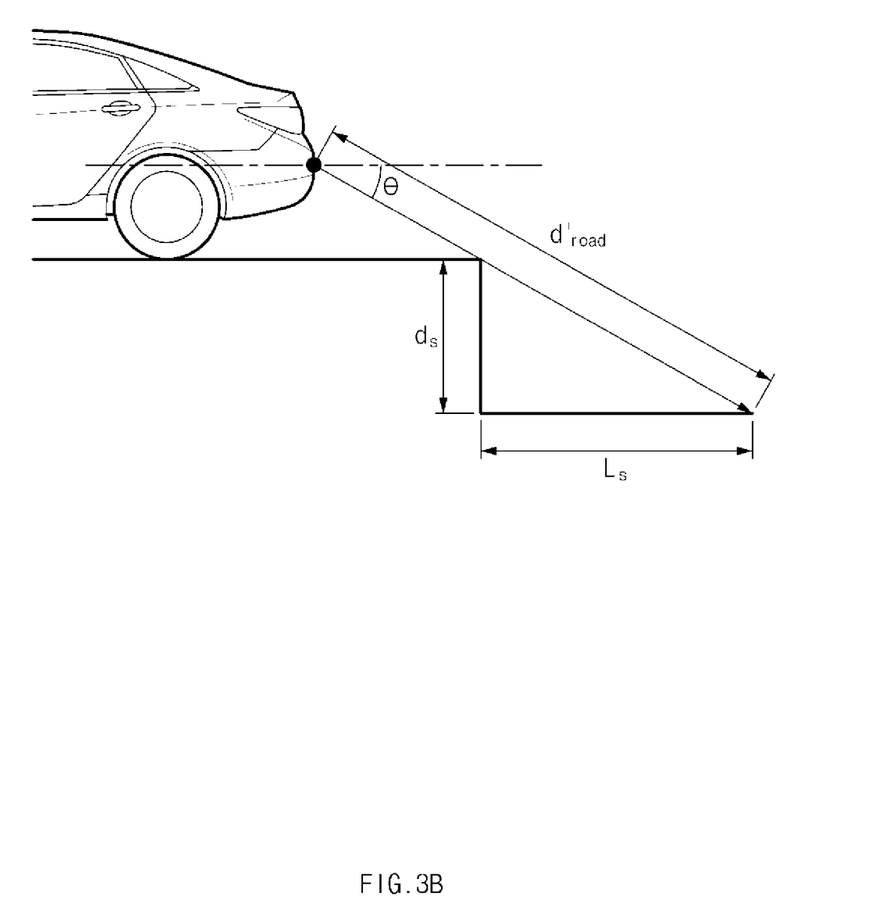
FIG. 3B is a view illustrating a process in which a controller recognizes a sinkhole according to an exemplary embodiment of the present disclosure.
Figure 3C:
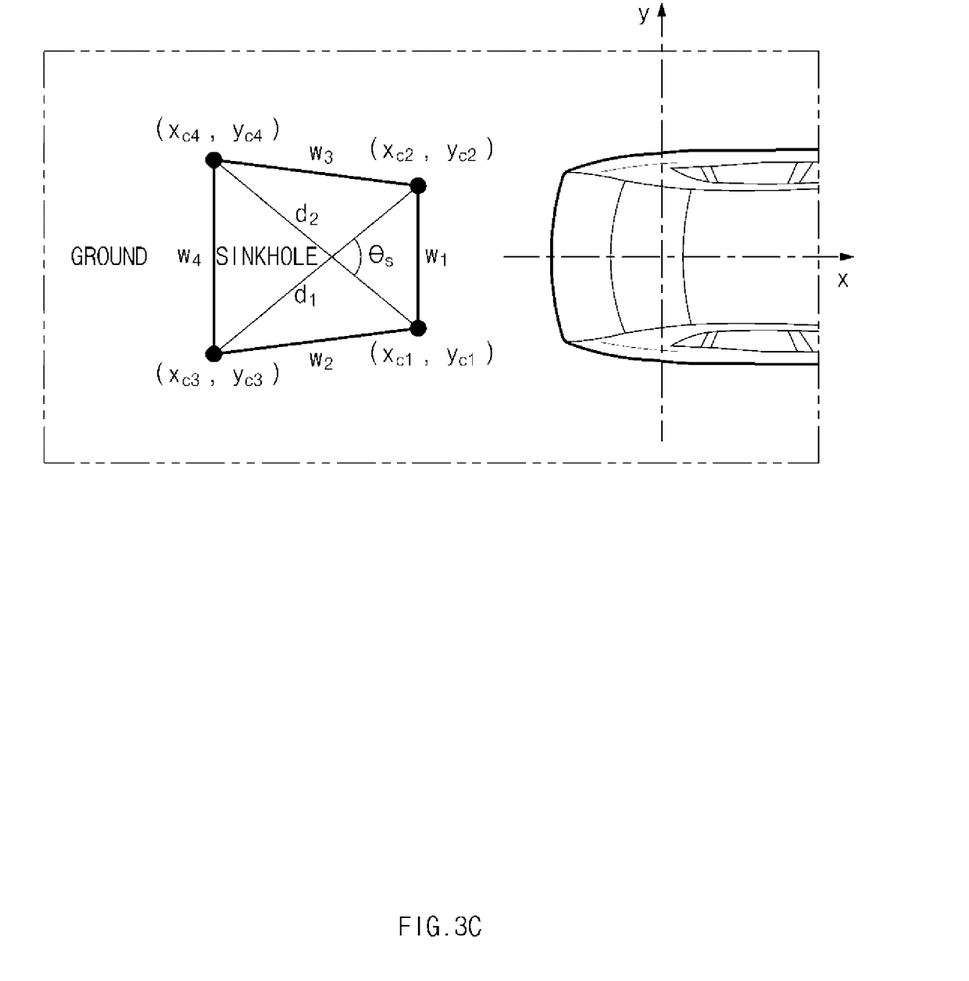
FIG. 3C is a view illustrating a process in which a controller detects a size of a sinkhole according to an exemplary embodiment of the present disclosure.

Hereinafter, processes of distinguishing the ground from the sinkhole and detecting the depth, the horizontal length, and the vertical length of the sinkhole as the size of the sinkhole by the controller 40 will be described with reference to FIGS. 3A to 3C. As shown in FIG. 3A, the controller 40 may be configured to detect the ground based on a first distance $d_{road}$ measured by the sensor 20 and detect the sinkhole based on a second distance $d'_{road}$ measured by the sensor 20 as shown in FIG. 3B.

In addition, the controller 40 may be configured to detect the depth ds of the sinkhole based on the following Formula 2.

$$ds = (d'_{road} - d_{road}) \times \sin\theta \qquad \text{Formula 2}$$

wherein, "θ" denotes the mounting angle, i.e., a beam angle of the sensor 20.

In addition, the controller 40 may be configured to detect the length Ls of the sinkhole based on the following Formula 3.

$$Ls = (d'_{road} - d_{road}) \times \cos\theta \qquad \text{Formula 3}$$

Further, the controller 40 may be configured to detect the starting point $(x_c, y_c)$ of the sinkhole based on the following Formula 4.

$$(x_c, y_c) = (x_s + d_{road} \times \cos\theta \times \cos\Phi, y_s + d_{road} \times \cos\theta \times \sin\Phi) \qquad \text{Formula 4}$$

wherein, "$x_s$" denotes an x-axis coordinate value as a mounting position of the sensor 20, and "$Y_s$" denotes a y-axis coordinate value as a mounting position of the sensor 20. "$d_{road}$" denotes the distance to the starting point of the sinkhole, "θ" denotes the vertical mounting angle of the sensor 20, and "Φ" denotes the horizontal mounting angle of the sensor 20.

In addition, as shown in FIG. 2B, the controller 40 may be configured to detect a width of the sinkhole using a first starting point $(x_{c1}, y_{c1})$ of the sinkhole, detected by the first sensor 20a, and a second starting point $(x_{c2}, y_{c2})$ of the sinkhole, detected by the second sensor 20b. Further, as shown in FIG. 3C, the controller 40 may be configured to detect an area of the sinkhole by detecting the first starting point $(x_{c1}, y_{c1})$ and a first end point $(x_{c3}, y_{c3})$ of the sinkhole using the first sensor 20a and the second starting point $(x_{c2}, y_{c2})$ and a second end point $(x_{c4}, y_{c4})$ of the sinkhole using the second sensor 20b.

In other words, the controller 40 may be configured to calculate a distance w1 from the first starting point $(x_{c1}, y_{c1})$ to the second starting point $(x_{c2}, y_{c2})$, calculate a distance w2 from the first starting point $(x_{c1}, y_{c1})$ to the first end point $(x_{c3}, y_{c3})$, calculate a distance w3 from the second starting point $(x_{c2}, y_{c2})$ to the second end point $(x_{c4}, y_{c4})$, and calculate a distance w4 from the first end point $(x_{c}3, y_{c}3)$ to the second end point $(x_{c4}, y_{c4})$. In addition, the controller 40 may be configured to calculate a distance d1 from the second starting point $(x_{c2}, y_{c2})$ to the first end point $(x_{c3}, y_{c3})$ and calculate a distance d2 from the first starting point $(x_1, y_{c1})$ to the second end point $(x_{c4}, y_{c4})$. Consequently, the controller 40 may be configured to detect the area of the sinkhole based on the following Formula 5.

$$S = \tfrac{1}{2} d_1 \times d_2 \times \sin\theta_s \qquad \text{Formula 5}$$

wherein, "$\theta_s$" denotes an angle between a straight line d1 and a straight line d2.

Further, the controller 40 may be configured to detect a hill (e.g., inclined road surface) based on the first distance $d_{road}$ and the second distance $d'_{road}$. Meanwhile, the controller 40 may be configured to obtain a steering angle of a steering wheel and a vehicle speed (e.g., a wheel speed) via a vehicle network. Particularly, the vehicle network may include a controller area network (CAN), a local interconnect network (LIN), a FlexRay, and a media oriented systems transport (MOST). Accordingly, the controller 40 may be configured to determine whether the sinkhole is present on a traveling path of the vehicle based on the vehicle speed and the steering angle. When the sinkhole is present on the traveling path of the vehicle, the controller 40 may be configured to operate the brake of the vehicle before the vehicle falls into the sinkhole.

Figure 4:
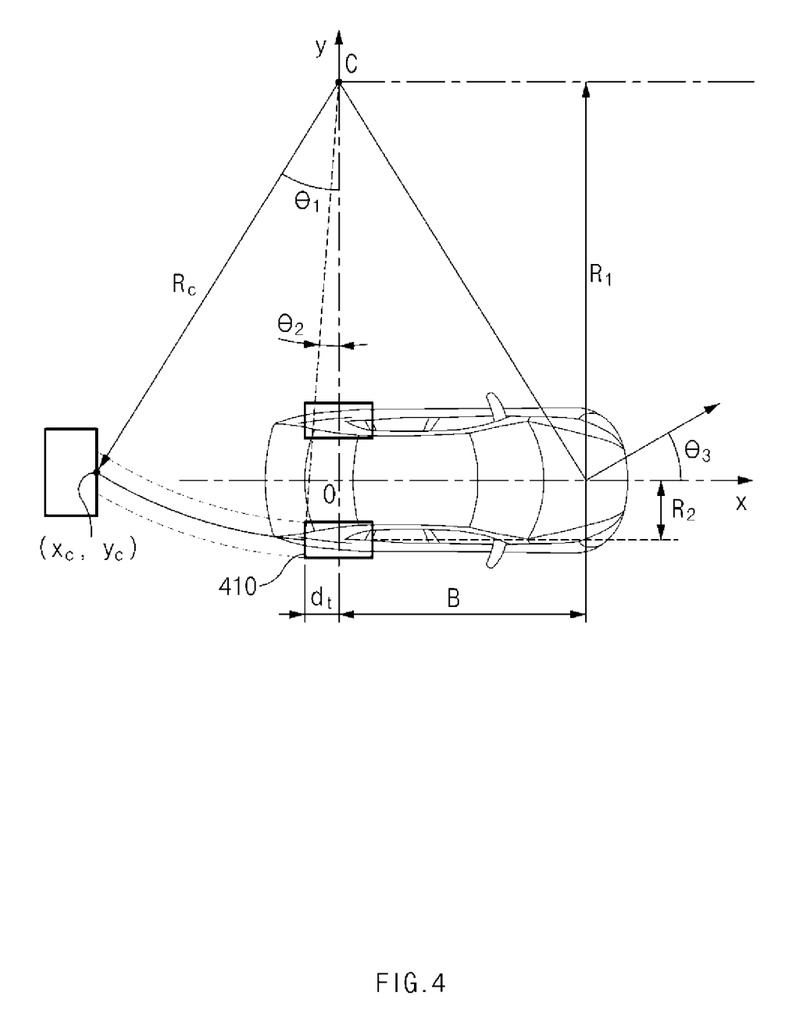
FIG. 4 is a view illustrating a process in which a controller estimates a predicted falling time of a vehicle based on a vehicle speed and a steering angle according to an exemplary embodiment of the present disclosure.

Hereinafter, a process in which the controller 40 estimates a time (hereinafter, referred to as a "predicted falling time") at which the vehicle falls into the sinkhole present on the traveling path of the vehicle based on the vehicle speed and the steering angle will be described in detail with reference to FIG. 4. FIG. 4 is a view illustrating the process in which the controller 40 may be configured to estimate the predicted falling time of the vehicle based on the vehicle speed and the steering angle according to an exemplary embodiment of the present disclosure. In the present exemplary embodiment, a case in which the vehicle moves backward will be described as a representative example, however, the process may be applied to a case in which the vehicle moves forward. Hereinafter, the rear wheel will be described as a concept including a tire.

In FIG. 4, $R_1$ denotes a radius of rotation of the vehicle, $R_2$ denotes a distance (that is a fixed value) from a center O of a rear shaft axle of the vehicle to a center of the rear wheel. In particular, $R_1+R_2$ corresponds to a distance $R_c$ from a center C of the radius of rotation to the starting point $(x_c, y_c)$ of the sinkhole. In addition, $R_1$ may be calculated based on the following Formula 6.

$$R_1 = \frac{B}{\tan\theta_3} \quad \text{Formula 6}$$

wherein, "$\theta_3$" denotes the steering angle of the vehicle. In addition, "$d_t$" denotes a distance from the center of the rear wheel to a surface of the rear wheel, "B" denotes a wheel base, "$\theta_1$" denotes an angle between a straight line, which connects the center C of the radius of rotation and the center O of the rear shaft axle of the vehicle, and the distance $R_c$, and "$\theta_2$" denotes an angle between the straight line, which connects the center C of the radius of rotation and the center O of the rear shaft axle of the vehicle, and a surface center of the rear wheel.

Therefore, the controller 40 may be configured to estimate the predicted falling time T of the vehicle based on the following Formula 7.

$$T = \frac{R_c \times (\theta_1 - \theta_2)}{v} \quad \text{Formula 7}$$

$$\theta_1 = \operatorname{atan2}(x_c, R_c - y_c)$$

$$\theta_2 = \operatorname{atan2}\left(d_t, \sqrt{(R_c)^2 - (d_t)^2}\right)$$

wherein, "v" denotes the wheel speed of the vehicle. When the vehicle moves backward, a wheel speed of a right rear wheel is used as "v". For reference, "a tan 2" is a function, and when "a tan 2(x, y)" has a value of "θ", then $$\tan\theta = \frac{x}{y}.$$

Figure 5:
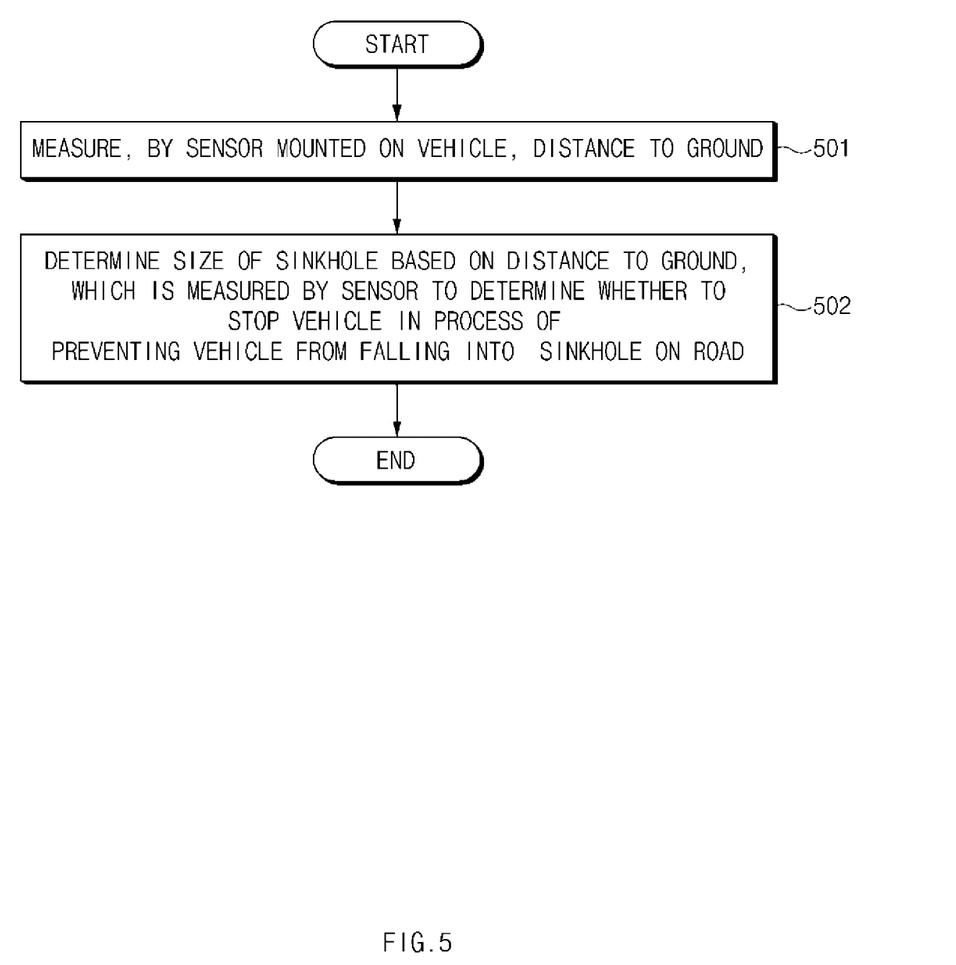
FIG. 5 is a flowchart illustrating an operation of a vehicle fall prevention method according to an exemplary embodiment of the present disclosure.

FIG. 5 is a flowchart illustrating an operation of a vehicle fall prevention method according to an exemplary embodiment of the present disclosure. First, the sensor 20 mounted on the vehicle may be configured to measure the distance to the ground (501). Then, the controller 40 may be configured to detect the size of the sinkhole based on the distance to the ground, which is measured by the sensor 20, to determine whether to stop the vehicle in the process of preventing the vehicle from falling into the sinkhole on the road (502). In other words, the controller 40 may be configured to detect the size of the sinkhole based on the distance to the ground, which is measured by the sensor 20, and stop the vehicle when the detected size of the sinkhole exceeds the reference value.

The controller 40 may be configured to stop the vehicle when the size of the sinkhole is greater than the size of the wheel to the extent that the vehicle is not capable of exiting out of the sinkhole. This corresponds to the case in which the sinkhole is present on the traveling path of the vehicle. When the sinkhole is not present on the traveling path of the vehicle, the vehicle is not required to stop since there is no risk of the vehicle falling into the sinkhole. In addition, the controller 40 may be configured to estimate the predicted falling time at which the vehicle is predicted to fall into the sinkhole present on the traveling path of the vehicle based on the vehicle speed and the steering angle, which are obtained via the vehicle network, to determine the stop time of the vehicle.

Figure 6:
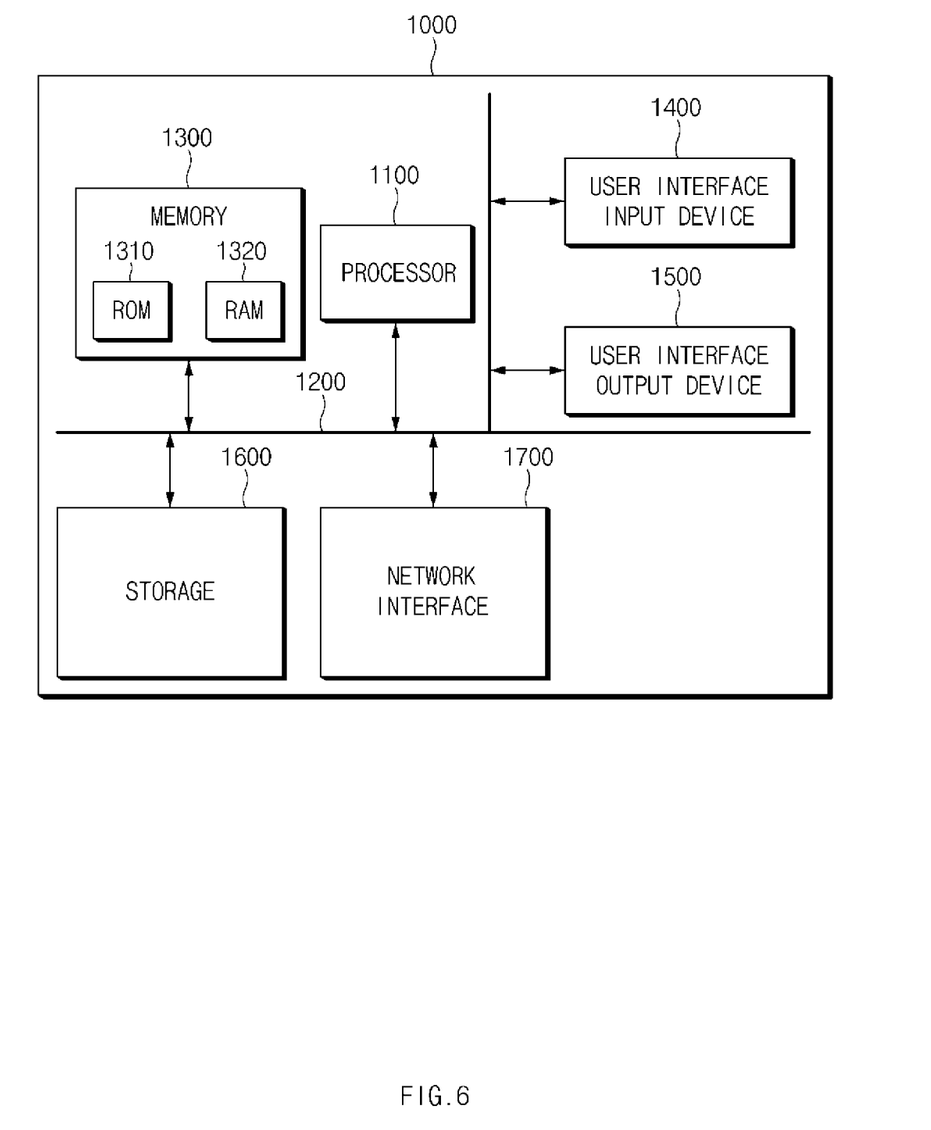
FIG. 6 is a block diagram illustrating a configuration of a computing system that executes a method according to an exemplary embodiment of the present disclosure.

FIG. 6 is a block diagram illustrating a configuration of a computing system that executes a method for preventing the vehicle from falling according to an exemplary embodiment of the present disclosure. Referring to FIG. 6, the method for preventing the vehicle from falling may be implemented by the computing system according to an exemplary embodiment of the present disclosure. The computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The apparatus and the method for preventing the vehicle from falling may prevent the vehicle from being unnecessarily stopped by determining whether to stop the vehicle based on the size of the sinkhole in the process of preventing the vehicle from falling into the sinkhole on the road.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the exemplary embodiments. The scope of the present disclosure should be construed on the basis of the accompanying claims, and all the technical ideas within the scope equivalent to the claims should be included in the scope of the present disclosure.

What is claimed is:

1. Apparatus of preventing a vehicle from falling, comprising:
    a sensor mounted on the vehicle to measure a distance to a ground; and
    a controller configured to:
        determine a size of a sinkhole based on the distance to the ground, measured by the sensor; and
        determine whether to stop the vehicle based on the determined size of the sinkhole,
    wherein the controller is configured to estimate a time at which the vehicle is predicted to fall into the sinkhole present on the traveling path of the vehicle based on a vehicle speed and a steering angle of the vehicle.

2. The apparatus of claim 1, wherein the controller is configured to distinguish the ground from the sinkhole based on the distance to the ground measured by the sensor.

3. The apparatus of claim 2, wherein the controller is configured to detect a depth and an area of the sinkhole based on the distance to the ground measured by the sensor.

4. The apparatus of claim 3, wherein the controller is configured to determine whether to stop the vehicle based on the depth and the area of the sinkhole.

5. The apparatus of claim 1, further comprising:
    a storage configured to store reference depth data and reference area data.

6. The apparatus of claim 1, wherein the controller is configured to determine whether the sinkhole is present on a traveling path of the vehicle based on the vehicle speed and the steering angle of the vehicle.

7. The apparatus of claim 1, wherein a plurality of sensors are provided and at least two sensors are mounted at a rear bumper of the vehicle.

8. The apparatus of claim 7, wherein each sensor is mounted on the vehicle to have a reference vertical angle and a reference horizontal angle.

9. The apparatus of claim 8, wherein the vertical angle is an angle that is two times or more greater than an angle between the ground and a virtual straight line that connects a center of the vehicle and a rear wheel and faces the ground.

10. A method of preventing a vehicle from falling, comprising:
    measuring, by a sensor mounted on the vehicle, a distance to a ground; and
    determining, by a controller, a size of a sinkhole based on the measured distance to the ground to determine whether to stop the vehicle based on the determined size of the sinkhole,
    wherein the determining of whether to stop the vehicle includes;
    estimating, by the controller, a time at which the vehicle is predicted to fall into the sinkhole present on the traveling path of the vehicle.

11. The method of claim 10, wherein the determining of whether to stop the vehicle includes:
    distinguishing, by the controller, the ground from the sinkhole based on the distance to the ground, measured by the sensor.

12. The method of claim 11, wherein the determining of whether to stop the vehicle includes:
    detecting, by the controller, a depth and an area of the sinkhole based on the distance to the ground, measured by the sensor.

13. The method of claim 12, wherein the determining of whether to stop the vehicle includes:
    determining, by the controller, whether to stop the vehicle based on the depth and the area of the sinkhole.

14. The method of claim 10, further comprising:
    storing, by a storage within the controller, reference depth data and reference area data.

15. The method of claim 10, wherein the determining of whether to stop the vehicle includes:
    determining, by the controller, whether the sinkhole is present on a traveling path of the vehicle based on a vehicle speed and a steering angle of the vehicle.

16. The method of claim 10, wherein a plurality of sensors are provided and at least two sensors are mounted at a rear bumper of the vehicle.

17. The method of claim 16, wherein each sensor is mounted on the vehicle to have a reference vertical angle and a reference horizontal angle.

18. The method of claim 17, wherein the vertical angle is an angle that is two times or more greater than an angle between the ground and a straight line that connects a center of the vehicle and a rear wheel and faces the ground.

* * * * *